United States Patent [19]

Inui et al.

[11] 4,437,102
[45] Mar. 13, 1984

[54] HEAT-SENSITIVE RECORDING APPARATUS

[75] Inventors: Toshiharu Inui; Haruhiko Moriguchi, both of Kanagawa, Japan

[73] Assignee: Fuji Xerox Co., Ltd., Tokyo, Japan

[21] Appl. No.: 320,037

[22] Filed: Nov. 10, 1981

[30] Foreign Application Priority Data

Nov. 17, 1980 [JP] Japan .................. 55-160798

[51] Int. Cl.$^3$ .............................. G01D 15/10
[52] U.S. Cl. ................................. 346/76 PH
[58] Field of Search ....................... 346/76 PH

[56] References Cited

U.S. PATENT DOCUMENTS 4,107,700  8/1978  Jornod ............... 346/76 PH
4,228,441 10/1980  Rhine ............... 346/76 PH X
4,235,555 11/1980  Aprato ............. 346/76 PH X

FOREIGN PATENT DOCUMENTS 55-144183 11/1980  Japan ............... 346/76 PH

Primary Examiner—George H. Miller, Jr.
Attorney, Agent, or Firm—Sughrue, Mion, Zinn, Macpeak & Seas

[57] ABSTRACT

The adjustment of pressure between the thermal head assembly and back roll in a thermal recording device is achieved by adjusting the bias force applied to the thermal head rather than the back roll, to thereby maintain a substantially constant contact pressure between the back roll and a drive roll.

3 Claims, 2 Drawing Figures

HEAT-SENSITIVE RECORDING APPARATUS

BACKGROUND OF THE INVENTION

This invention relates to a heat-sensitive recording apparatus in which a thermal head records data on a recording sheet.

For instance, in a heat-sensitive recording apparatus using an ink donor film, the thermal head is brought into contact with the ink donor film and the heat generating units of the thermal head are selectively heated according to video data to be recorded. More specifically, thermally sensitive ink coated on the ink donor film is molten according to the video data, and the ink thus molten is transferred onto the recording sheet, so that the video data are recorded on the sheet. In such a thermal transfer type heat-sensitive recording apparatus, it is necessary to press the sheet through the ink donor film against the thermal head under a predetermined pressure.

FIG. 1 illustrates the recording section of a conventional thermal transfer type heat-sensitive recording apparatus.

As shown in FIG. 1, an ink donor film 1 and a sheet 2 piled one on another are conveyed to the contact region 5 between a thermal head 3 and a back roll 4. The back roll 4 is rotatably mounted on the free end portion of a back roll mounting arm 6 with the aid of a spring 7. During normal operation, the back roll mounting arm 6 is positioned as shown in FIG. 1, and the back roll is pressed against the thermal head by means of the spring 7. The back roll 4 is rotated in the direction of the arrow by a drive roller 8 which is in contact with the back roll 4. The ink donor film 1 and the sheet 2 pass through the contact region 5 while being pressed against the heat generating elements of the thermal head 3. After recording, the ink donor film 1 and the sheet 2 piled one on another are delivered together to the contact region (or nipping region) 9 between the back roll 4 and the drive roll 8. The direction of advancement of the ink donor film 1 is then changed abruptly to the direction of the arrow A at the contact region 9, and simultaneously the sheet 2 is peeled off the film 1. The sheet 2 thus peeled off is moved in the direction of the arrow B and it is finally placed in a paper tray (not shown).

In such a heat-sensitive recording apparatus, the pressure of the ink donor film 1 and the sheet 2 against the thermal head 3 is controlled by the spring 7. Therefore, the recording apparatus suffers from a drawback that the contact pressure between the back roll 4 and the drive roll 8 is changed whenever the spring 7 is adjusted, and accordingly the ink donor film 1 and the sheet cannot satisfactorily or smoothly pass through the contact region 9 without readjusting the contact pressure. If one adjustment is performed, then the other adjustment must also be performed. Therefore, only a skilled person can achieve the adjustment properly.

SUMMARY OF THE INVENTION

In view of the foregoing, an object of this invention is to provide a heat-sensitive recording apparatus in which the pressure of the back roll against the thermal head can be adjusted without varying the positional relationship between the back roll and the drive roll.

Briefly, the foregoing object of this invention is achieved by providing a pressure controlling mechanism on the thermal head side for adjusting a presure applied to the back roll.

BRIEF DESCRIPTION OF THE DRAWINGS

The invention will now be described with reference to the accompanying drawings, in which.

DETAILED DESCRIPTION OF THE INVENTION

Figure 1:
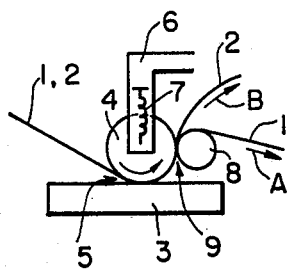
FIG. 1 is a side view showing the essential components of a conventional heat-sensitive recording apparatus.
Figure 2:
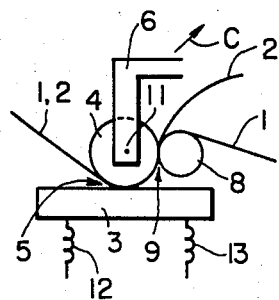
FIG. 2 is a side view showing the essential components of one example of a heat-sensitive recording apparatus according to this invention.

FIG. 2 shows the recording section of a heat-sensitive recording apparatus according to this invention, which is in a recording condition. A back roll mounting arm 6 can be turned in the direction of the arrow C around a base (not shown) when an ink donor film is replaced or to remove a sheet 2 which may be jammed in the machine, whereby a back roll 4 mounted on a shaft 11 secured to the free end of the back roll mounting arm 6 is raised upwardly to a release state so that clearance necessary for the above-described replacing or cleaning operations is provided between the back roll 4 and a thermal head 3 and between the back roll 4 and a drive roll 8, respectively. In the other cases, the back roll mounting arm 6 is fixed as shown in FIG. 2. Under this condition, the positional relationship between the back roll 4 and the drive roll 8 is maintained unchanged, and accordingly the contact pressure in the contact region 9 between the rolls 4 and 8 is also maintained constant.

On the other hand, the thermal head 3 is mounted on a frame (not shown) through adjustable springs 12 and 13 secured to both ends of the bottom of the thermal head 3. With this arrangement, even if the ink donor film 1 and the sheet 2 are pressed against the thermal head 3 by the springs 12 and 13, the contact pressure in the contact region 9 is not changed.

As is apparent from the above description, the pressure adjusting mechanism for adjusting the pressure of the ink donor film and the sheet against the back roll is provided on the side of the thermal head according to this invention. Accordingly, even if an external force is applied to the thermal head when the back roll mounting arm is released, it can be sufficiently absorbed, and therefore the thermal head can be protected from damage.

In the above-described embodiment, the back roll is mounted directly on the back roll mounting arm; however, it may instead be mounted thereon through an unadjustable spring.

While the invention has been described with reference to a thermal transfer type heat-sensitive recording apparatus, it goes without saying that the technical concept of the invention can be similarly applied to any heat-sensitive recording apparatus in which a heat-sensitive sheet having a heat-sensitive layer on its base sheet is used and coloring is effected by heating the heat-sensitive sheet.

What is claimed is:

1. A heat sensitive recording apparatus, comprising:
   a thermal head assembly for selectively causing heat generating elements to generate heat according to image data;
   a back roll for maintaining pressure against said thermal head assembly to sandwich a thermally sensitive recording medium and a printing sheet therebetween;

a rotatable back roll mounting arm for mounting said back roll thereon, a position of said back roll being substantially fixed by said back roll mounting arm during a recording operation;

at least one adjustable spring urging said thermal head assembly toward said back roll with an adjustable force;

said thermal head assembly including a first surface for contacting said recording medium and a second surface opposite said first surface, said spring exerting a force against said second surface and toward said back roll; and a drive roller contacting said back roll at a position downstream of a position where said recording medium and said printing sheet are sandwiched between said thermal head assembly and said back roll to drive said back roll during a recording operation.

2. The heat sensitive recording apparatus as claimed in claim 1, wherein said back roll is directly mounted on said back roll mounting arm.

3. The heat sensitive recording apparatus as claimed in claim 1, further comprising an unadjustable spring, said back roll being mounted on said back roll mounting arm by said unadjustable spring.

* * * * *